Figure 1:
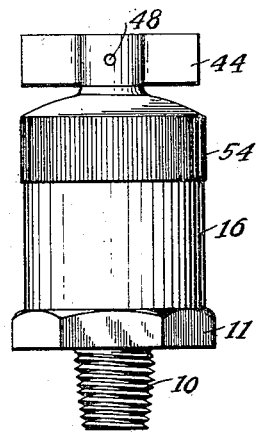

D. H. TWAITS.
GREASE CUP.
APPLICATION FILED DEC. 29, 1913.

1,241,584.

Patented Oct. 2, 1917.

WITNESSES:
Robert L. Bruck.
Justin W. Macklin

INVENTOR,
Daniel H. Twaits,
By Albert H. Bates,
ATTYS

UNITED STATES PATENT OFFICE.

DANIEL H. TWAITS, OF CHICAGO, ILLINOIS.

GREASE-CUP.

1,241,584. Specification of Letters Patent. Patented Oct. 2, 1917.

Application filed December 29, 1913. Serial No. 809,147.

*To all whom it may concern:*

Be it known that I, DANIEL H. TWAITS, a citizen of the United States, residing at Chicago, in the county of Cook and State of Illinois, have invented a certain new and useful Improvement in Grease-Cups, of which the following is a full, clear, and exact description, reference being had to the accompanying drawings.

This invention is for grease cups of a type wherein there is a body portion and a cap secured to the body portion, a plunger within the cap and a screw device for moving the plunger to force the grease from the interior of the cup. The general object of the invention is to provide a durable grease cup which shall be efficient in operation, simple in construction and have a neat appearance. More specific objects are to provide an efficient detent device for preventing the cup from becoming inadvertently displaced, to prevent the leakage of the grease, and to provide a plunger efficient in operation and of simple construction.

My invention is hereinafter more fully described in connection with the drawing, and the essential characteristics set forth in the claims.

Figure 2:
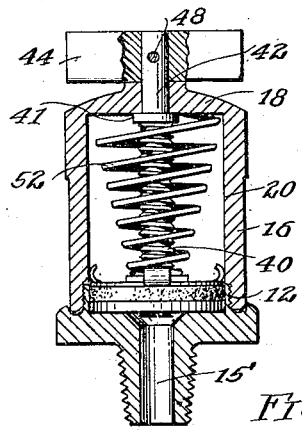
Figure 3:
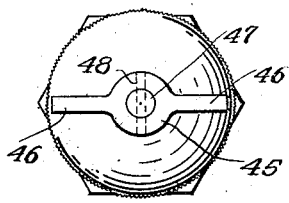
Figure 4:
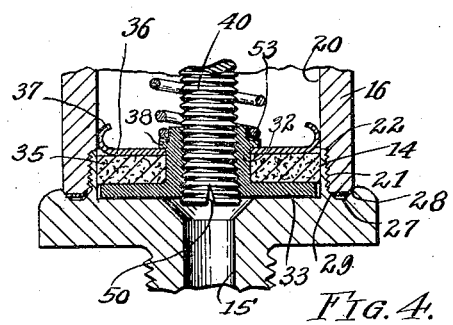
Figure 5:
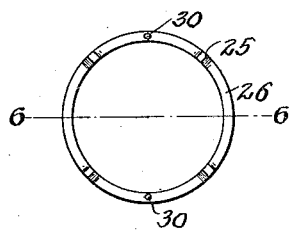
Figure 6:
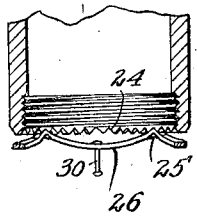
Figure 7:
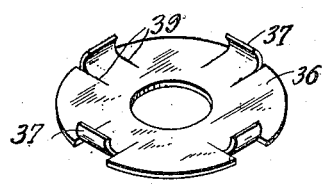

Figure 1 is a side elevation of my grease cup; Fig. 2 is a vertical central section of the cup and body, showing the plunger and a screw for reciprocating the same, in elevation; Fig. 3 is a plan of the grease cup; Fig. 4 is an enlarged sectional detail of the plunger; Fig. 5 is a detail of the detent washer; Fig. 6 is a sectional detail showing the washer in engagement with the bottom of the cup; Fig. 7 is a perspective view of part of the plunger showing means for preventing the plunger turning within the cup.

The body portion or base of the cup, comprises a threaded nipple 10 integral with an enlarged angular portion 11, preferably hexagonal, from which rises an externally threaded portion 12. This portion 12 is internally bored, as at 14, and a passage 15 through the nipple opens upwardly into the bottom of the bore 14. The cup member 16 is substantially cylindrical and closed at its upper end, at 18, and the greater portion of its interior is cylindrically bored as at 20, to the same size as the bore 14, and an enlarged portion of the bore 21 is internally threaded to fit the exterior threads of the portion 14. A shoulder 22 is formed above the threaded bore 21, and the bore 20 of the cup which fits the top of the portion 14, provides a smooth joint between the bores 14 and 20.

To prevent the cup becoming displaced after it is screwed into place, I provide on the lower edge of the cup, a series of notches 24, adapted to coöperate with raised portions or humps 25, in a circular spring 26. This spring lies in the bottom of an annular groove 27 made in the shoulder of the body portion, and is so arranged that the parts of the spring between the humps 25 normally bend upwardly, raising these humps into a spring engagement with the notches. The spring, however, is substantially flat when the cup is screwed into position, except for the humps engaging the notches, and in this position the beveled edges 28 and 29 engage corresponding beveled surfaces at the sides of the annular grooves, 27, making a very tight joint at the lower edge of the cup, thereby preventing any grease which has leaked past the threads, coming to the exterior of the cup. The spring 26 is secured against rotation by means of suitable rivet pins such as indicated at 30, Figs. 5 and 6.

The plunger comprises an internally threaded sleeve 32 integral with an outwardly extending washer-like portion 33, which engages the lower side of a resilient member 35 of leather, felt or like material. This resilient member is held in place on the top side of the portion 33, by a washer-like member 36 having a central opening embracing the sleeve 22, which is secured in position by an outwardly turned flange 38 formed on the sleeve 32. The greater portion of the periphery of this washer slidably fits the interior of the bore 20, and insures the periphery of the resilient member being in engagement with the bores. At the outer edge of this washer are provided spring portions or ears 37, made by bending up ears which project radially from the blank washer, when being formed, and at the same time cutting these portions back into the washer, as at 39, to provide a greater length for the spring portion and thereby greater resiliency of these spring members. These press outwardly and engage the interior of the bore 20 as is shown in Fig. 4, and prevent the plunger being rotated within the cap while allowing it to reciprocate vertically.

Threaded into the sleeve 32, is a screw 40 having near its upper end a flange 41, engaging the under side of the closed end 18 of the cup, and having a shank 42 extending through a suitable opening in this closed end. Mounted on the upper end of this shank is a wing 44 providing a suitable grip for rotating the screw. This wing cap is preferably made by pressing or stamping from a thick piece of metal, a blank of the shape shown in Fig. 3, having a substantially cylindrical central portion 45 and two outwardly extending portions 46, and at the same time punching a hole 47 through the cylindrical portion, for receiving the shank 42. This blank may be thus very conveniently made, it being only necessary to provide suitable dies adapted to shear out the blank of the shape shown, and a punch adapted to punch the hole 47. After being formed, the wing is secured on the shank 42 by a suitable pin 48. It will be seen that when the wing 44 is rotated, rotating the screw 40, that the plunger will be reciprocated within the cup and if moved downwardly will force the grease out of the cup from the passage 15 onto the bearing surfaces. The spring members 37 engaging the interior of the bore offer practically no resistance to the vertical movement of the plunger, but at the same time prevent the plunger turning when the screw 40 is turned, by producing much greater friction at the periphery of the plunger than is caused at the central portion, by the turning of the screw.

The bore 14 is preferably of such a depth that when the plunger is in its down position, as shown, the edge of the washer 36 will still be engaging the bore 20, so that when the plunger is moved clear down to force out all the grease and the cap is then removed for refilling, perhaps before drawing the plunger back into the cup, the plunger is prevented from moving laterally by this engagement of the washer, which thereby prevents the periphery of the resilient member becoming roughened or damaged on the threaded portion 21. This might be the case if the plunger were free to move when in its down position, this movement being allowed by reason of the play at the shank 42. The lower end of the screw 40 is spread by splitting it for a short distance, as indicated at 50, which prevents the plunger becoming removed from the end of the screw.

A spiral spring 52 having its large end engaging the upper end of the cup and its smaller end surrounding a portion of the sleeve 32, as at 53, may be provided to make it easier to force the grease from the cup and at the same time to prevent rattling or vibration of the parts. This spring has a frictional engagement with the plunger and also with the top of the cap, whereby the spring serves the additional purpose of tending to prevent the rotation of the plunger by reason of the engagement of the upper end of the spring with the normally stationary cap. The cup 16 is provided at its upper end with a tubular knurled portion 54 which facilitates screwing the cup onto and removing it from the base.

From the foregoing description, it will be seen that I have provided a detent for the cup which is not only efficient but which is entirely concealed, leaving a neat appearance on the outside of the cup. I have also provided an efficient and simple plunger, and have provided a grease cup which may be very cheaply manufactured.

Having thus described my invention, what I claim is:

1. In a grease cup, the combination of a base having a male threaded portion and a shoulder extending outwardly beneath the threads, a cap having internal threads cooperating with the male portion and having a notch in its lower edge, and a detent spring carried by said shoulder and engaging said notch.

2. In a grease cup, the combination of a base having a male threaded portion and a shoulder extending outwardly beneath the threaded portion, a cap having internal threads fitting the threads of the base and having notches in its lower edge, an annular groove in said shoulder, and a detent spring secured in the bottom of the groove and having an upward projection engaging the notch in the cap.

3. In a grease cup, the combination of a base having a male threaded portion, an outwardly extending shoulder beneath said threaded portion, a cap having internal threads fitting the threads of the base and having a notch in its lower edge, an annular groove in said shoulder opening upwardly, and means in the annular groove engaging the notch in the cap, said cap having its lower edges engaging the sides of the groove.

4. In a grease cup, the combination of a base having a threaded nipple and an upwardly extending male threaded portion and a shoulder extending outwardly beneath said threaded portion, a cap having internal threads fitting said threaded portion and having a series of notches in its lower edge, and a detent spring secured in the bottom of the groove having upward projections adapted to engage said notches in the cap said groove having flaring sides, said cap having beveled edges engaging said flaring sides when in position.

5. In a grease cup, the combination with a base having an upwardly extending threaded portion and a shoulder extending outwardly at one end of the threaded portion, of a cap having threads fitting said threaded portion and having a series of notches in its lower edge, a detent spring secured to said shoulder at the notched edge of the cap and having projections adapted to engage the notches in the cap, and an annular flange on said shoulder projecting toward the cap and adapted to tightly engage the cap adjacent the notches.

6. In a grease cup, the combination of a base having an outwardly extending portion and an upwardly extending male threaded portion said male threaded portion being internally bored, and a cap having a bore and an enlarged threaded portion engaging the threads of the male portion so arranged that the two bores register when in position, a groove adjacent the bottom of said male threaded portion, a detent spring in said groove, and notches in the bottom of the cap engaging said detent spring said groove having its sides in engagement with the lower edge of the cap when in position.

7. In a grease cup, the combination of a base, a cap threaded thereon, a plunger, a screw within the cap and extending outside the cap and a wing outside the cap for turning said screw to reciprocate the plunger said plunger comprisng a washer having an internally threaded sleeve engaging the screw, an intermediate resilient member engaging the interior of the cap, and a washer engaging the other side of the resilient member said last named washer surrounding said sleeve and being held in place by a flange upset from the sleeve, and means on said last mentioned washer for frictionally engaging the interior of the cap to prevent the plunger turning.

8. In a grease cup, the combination of a base, a cap threaded thereon, a plunger, a screw within the cap and extending outside the cap, a wing outside the cap for turning said screw to reciprocate the plunger said plunger comprising a washer having an internally threaded sleeve engaging the screw, an intermediate resilient member engaging the interior of the cap, and a washer engaging the other side of the resilient member said last named washer surrounding said sleeve and being held by a flange upset from the sleeve, and spring ears integral with said last named washer engaging the interior of the cap to prevent the plunger turning.

9. In a grease cup, the combination of a base, a cap threaded onto the base, a screw within said cap and a plunger adapted to be reciprocated by said screw comprising a washer having an upwardly turned internally threaded sleeve said washer being slightly smaller in diameter than the interior of the cup, a resilient member carried by said washer, and a second washer engaging said sleeve and the other side of said resilient member, a flange turned outwardly from said sleeve engaging said washer, and spring ears curled upwardly from said washer at its periphery and being cut back from the periphery of the washer to allow greater resiliency, said ears engaging the interior of the cap to prevent rotary movement of the plunger.

10. In a grease cup, the combination of a base and a cap, a plunger in the cap comprising a resilient member and a metallic member on either side of the resilient member one of said metallic members having spring portions integral with its outer edge in engagement with the interior of the cup.

11. In a grease cup, the combination of a base having a threaded nipple and an upwardly extended threaded portion, a shoulder extending outwardly below said threaded portion of the base and having a series of notches in its lower edge said shoulder having a groove, and a detent spring in said groove having an upward projection adapted to engage the notches in the cap, said cap being adapted to tightly engage the sides of said groove when in position.

In testimony whereof, I hereunto affix my signature in the presence of two witnesses.

DANIEL H. TWAITS.

Witnesses:
JUSTIN W. MACKLIN,
BRENNAN B. WEST.

Copies of this patent may be obtained for five cents each, by addressing the "Commissioner of Patents, Washington, D. C."